March 10, 1964 F. V. ADAMS 3,124,783

DATA TRANSMISSION CHECKING MEANS

Filed June 22, 1959

INVENTOR
FRANCIS V. ADAMS

BY Paul M. Brannen

AGENT

United States Patent Office 3,124,783
Patented Mar. 10, 1964

3,124,783
DATA TRANSMISSION CHECKING MEANS

Francis V. Adams, Endicott, N.Y., assignor to International Business Machines Corporation, New York, N.Y., a corporation of New York Filed June 22, 1959, Ser. No. 821,900
10 Claims. (Cl. 340—146.1)

Figure 1:
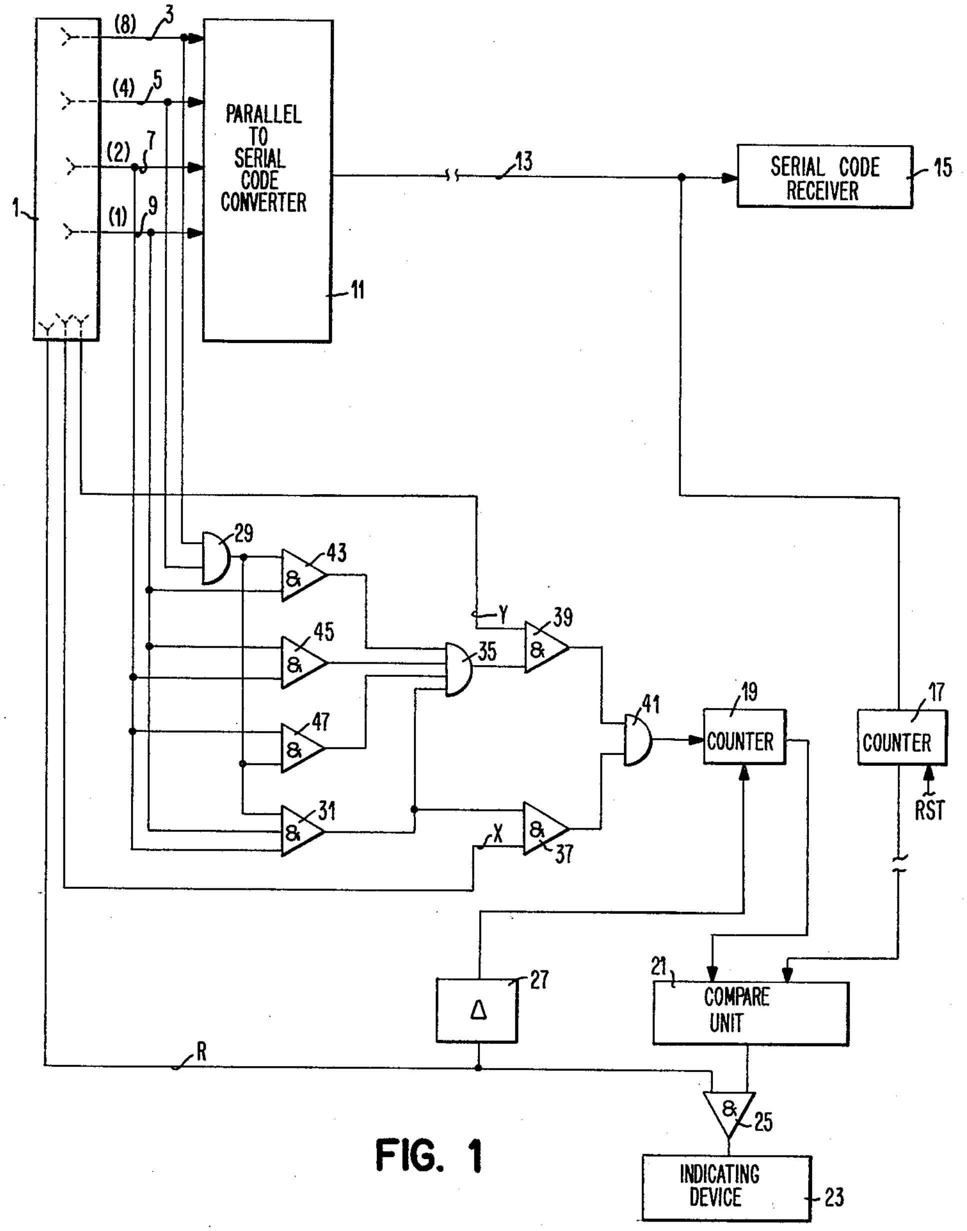

This invention relates to data transmission systems, and particularly to improved means for checking the accuracy of data transmitted by such systems. More particularly, this invention relates to an improved means for determining the number of bits transmitted from a sending location and received at a receiving location, which means is immune to failures occasioned by loss of a bit during the data transmission.

It has previously been proposed to check the validity of data transmitted in encoded form by counting the number of transmitted signals at the transmitting location, counting the number of received signals at the receiving location, and comparing the total counts. Such an arrangement will detect a loss of bits occurring at any point in the system following the point at which the transmitted count is made, but cannot detect a loss of bits or a single bit occurring prior to the transmission check point.

Accordingly, it is a principal object of this invention to provide improved checking means for data transmission systems.

Another object of the invention is to provide improved checking means for data transmission systems in which the transmitted data is in the form of binary units or bits.

A further object of the invention is to provide improved checking means for data transmission systems in which binary bits of data are transmitted in groups or characters of predetermined combinations of bits.

Still another object of the invention is to provide improved checking means for data transmission systems, in which a predetermined number of characters, each comprising one or more bits of information, are transmitted during each transmission cycle.

Yet another object of the invention is to provide improved checking means for data transmission systems in which information encoded in parallel form is translated to serial form and transmitted in serial form.

Briefly described, the invention contemplates the use of a data transmission code in which each character transmitted contains, or should properly contain, at least one bit of information. Also, the number of characters to be transmitted during each transmission cycle are fixed or predetermined, at least for the cycle involved. The number of characters to be transmitted in any given transmission cycle is designated as N. At the transmitting location, a transmission counting means, such as an electronic counter, is provided, which operates on a predetermined base or radix, designated hereafter as $r$. Prior to the start of each transmission cycle, the transmitting check counter is reset to an initial condition in which it is set to contain an initial count equal to the remainder of the division $N/r$. This is equivalent to placing a single count in the counter for each character to be transmitted assuming that each character contains one bit and one bit only. Since, however, the characters can contain more than one bit, provision is made for entering additional counts in the counter for characters containing a combination of two bits, or a combination of three bits, etc. In the embodiment disclosed, a code is used which never contains more than three bits; but it will be apparent from the description which follows that other codes may be employed by modifying the apparatus in a manner which will be apparent to those skilled in the art.

It can thus be seen that the transmission check counter is rendered effective to provide an output which reflects the actual count of the transmitted bits.

At the receiving end of the data transmission system, receiving counting means is provided, such as a conventional counter, operating on the same or different base or radix as the transmitting check counter, and adapted to provide a count of all bits received.

The outputs of the transmitting and receiving counters are supplied to a comparing unit which compares the outputs of the two counters. The output of the comparing unit indicates whether or not the transmitted data was correctly received and can be employed for the operation of any type of utilization device, as, for example, an alarm device which will indicate to an operator that an incorrect transmission has occurred.

The foregoing and other objects, features and advantages of the invention will be apparent from the following more particular description of a preferred embodiment of the invention, as illustrated in the accompanying drawings.

Figure 2:
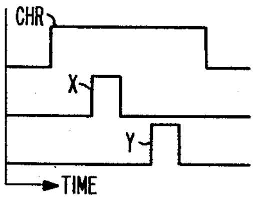

In the drawings:

FIG. 1 is a diagrammatic illustration of a preferred embodiment of the invention as employed with a data transmission system in which data is converted from parallel to serial form prior to transmission, and FIG. 2 is a diagrammatic illustration of certain of the signals encountered in the arrangement shown in FIG. 1.

Similar reference characters refer to similar parts in each of the drawings.

Referring now to FIG. 1, the reference character 1 designates a source of data, the details of which are unimportant to the present invention, but which may be, for example, a data processing machine or system, from which it is desired to transmit data or information to a remote receiving location. It is assumed that the information to be transmitted is, at the output of the source 1, encoded in a parallel type of code in which the presence of concurrent signals on one or more output lines designates the value of the character. As shown on the drawing, four output lines are provided, designated by reference characters 3, 5, 7, and 9. The value of the signals on each of the lines is indicated thereon by the numeral in parenthesis. In conventional fashion, decimal number values are indicated by signals on one or more lines, as given in the following table:

| Decimal Number Value | Output Line(s) Energized | Binary Value(s) |
|---|---|---|
| 0 | 3 and 7 | (2) and (8). |
| 1 | 9 | (1). |
| 2 | 7 | (2). |
| 3 | 7 and 9 | (2) and (1). |
| 4 | 5 | (4). |
| 5 | 5 and 9 | (4) and (1). |
| 6 | 5 and 7 | (4) and (2). |
| 7 | 5, 7, and 9 | (4), (2), and (1). |
| 8 | 3 | (8). |
| 9 | 3 and 9 | (8) and (1). |

Because positive presence of a signal is used to insure that omission of a signal will not falsely indicate the presence of information, the transmission of an 8 bit and a 2 bit is used to represent the decimal number value zero.

Moreover, in the transmission of any one group of characters in a transmission cycle, it may be desirable to transmit a "blank" character signal, indicating that no numeric value is to be assigned to that particular character. Such a character is indicated in the present embodiment by simultaneous signals on lines 3, 7, and 9, with binary values of 8, 2, and 1.

The data source also provides counting pulses required for the operation of the checking apparatus, these pulses appearing at predetermined time intervals on lines designated as X, Y, and R, the purpose and relationship of these signals to be subsequently described.

As is usually the case where information is to be transmitted over a relatively long distance, the information is converted from parallel form to serial form, in which the information is transmitted in serial combinations over a single transmission channel. The conversion from parallel to serial form is accomplished by any suitable means, indicated by the designated rectangle 11, the details of which are not shown since they are not pertinent to the present invention.

The data or information is fed serially from the converter 11 to the transmission channel 13, over which it is transmitted to a remote serial code receiver 15. The data supplied to the code receiver 15 may be decoded or otherwise employed, such subsequent use being immaterial to this invention and hence not specified.

Associated with the code receiver at the remote location is a receiving check counting means, such as the counter 17, which has its input connected to the transmission channel 13 so as to count all incoming signal pulses. This counter is conventional in construction and is initially set to zero before the start of each transmission cycle by means not shown, which provides a reset signal RST to the counter. The counter thus counts the total number of bits supplied to the receiver 15.

Adverting now to the apparatus at the transmitting location, there is provided a transmitting check counting means or counter, designated by the labeled rectangle 19. This device may take any one of a number of well-known forms and may be either electromechanical or electronic in nature depending upon the operating requirements with respect particularly to speed required in the code transmission. The only specific requirement of the counter is that the counter be settable to a predetermined value equal to the remainder of $N/r$, prior to the start of each transmission cycle. In an electromechanical counter, for example, of the well known type comprising a ratchet wheel and operating electromagnet, the wheel operating one or more electrical contacts to designate the number of pulses supplied to the magnet, the counter wheel may either be set by hand, or a sufficient number of input signals can be entered via a reset line, not shown, to step the counter from a zero condition to the point where the count stands at the remainder of $N/r$. In an electronic counter, say, of the type having a plurality of cascade connected binary stages, a reset signal can be supplied to the appropriate stages to set them in a condition equivalent to the supply of the remainder of $N/r$ input pulses to the input of the counter. An example of one type of presettable electronic counter which could be used in the subject invention is shown in U.S. Patent 2,766,936, issued October 16, 1956, to Robert P. Dimmer, for Electronic Preset Revolution Counter Device. The output of counter 19 is supplied to one input of a comparing unit 21, the other input to this unit being the output of counter 17. The comparing unit 21 is constructed and arranged so that a comparison of the counters 17 and 19 is made and it provides an output which can be indicative either of the equality of the inputs or a disparity of the inputs. Since the number of characters transmitted in each cycle is fixed, a single output line could be energized, for example, when the proper count has been reached by the counters. If these outputs are both energized at the same time, the comparing unit would then supply an output indicating the proper correspondence of counts between the transmitting and receiving counters. The output of comparing unit 21 is supplied to a suitable utilization device, such as the indicating device 23, via an AND circuit or gate 25. The second, or control, input to AND circuit 25 is the R or reset signal, which is provided from the source 1 at the end of each transmission cycle. Thus, at the end of each transmission cycle, the R pulse enables the output of compare unit 21 to actuate the indicating device 23, to indicate a correct transmission or a disparity as the case may be. The R pulse is also supplied, via a suitable delay device 27, to counter 19 to reset the counter to a suitable state for the next transmission.

The remainder of the apparatus associated with the transmitting checking portion of the system comprises a plurality of logical circuits which determine whether none, one, or two input pulses are supplied to the input of counter 19. If the code combination for a particular character calls for only a single bit, such as the 2, 4, or 8 characters, then no input is provided to the counter, in view of the fact that the counter has already been preset to a number which is equivalent to the condition where one bit is present in each and every character. For characters having two bits and two bits only, one additional count must be entered into the counter. For characters containing three bits, two additional bits must be entered into the counter. These additional counts are obtained by supplying counting pulses, such as an "X" pulse, a "Y" pulse, or both in the succession X-Y, depending upon whether or not one or two counts are to be added to the counter. The actual means of generating the counting pulses "X" and "Y" is not shown, since it could take any of a number of different forms and the actual form is not pertinent to the present invention. The "blank" character having the binary value (8) and (1) and (2) requires the entry of two counts into the counter, as does the decimal value 7 which has a binary value of (4) and (2) and (1). With either the (4) output line 5 or the (8) output line 3 energized, an output is provided from an OR circuit 29. This output is supplied to one input of a 3-way AND circuit 31, the remaining two inputs being connected to the lines 7 and 9 which have binary output values of (2) and (1), respectively. The output of AND circuit 31 is supplied directly to one input of an AND circuit 37, and via OR circuit 35 to one input of an AND circuit 39, the other inputs to these two AND circuits being the X and the Y signal lines, respectively.

The X and the Y signals are provided on the X and the Y lines, in the succession named, during the time that the data output lines are energized; i.e., the data output pulses exist on their respective lines for a time interval during which first the X signal is supplied, followed after a brief interval by a Y signal. This sequence is illustrated in FIG. 2, where the pulse CHR indicates the time occupied by the signals on the output lines from source 1, and X and Y indicate the counting pulses.

Considering the instance where either of the 3-bit characters are present, it can be seen from the previous description that signals to one of the two inputs of each of AND circuits 37 and 39 will exist, so that an X pulse is supplied to counter 19 via AND circuit 37 and OR circuit 41, followed by a Y pulse, supplied via AND circuit 39 and OR circuit 41. Thus, for every 3-bit character supplied from source 1, two additional counts are entered into counter 19. These two additional counts along with the one count per character preset in the counter represent the correct total bits in the character; namely, three.

Now, consider the instance where a character having two bits and two bits only is supplied from source 1 for transmission. In the present embodiment, such characters are the decimal values 0, 3, 5, 6, and 9 having the respective binary bit values (8) and (2), (2) and (1), (4) and (1), (4) and (2), and (8) and (1), respectively. These combinations are detected by the combination of signals supplied to AND circuits 43, 45, and 47. The inputs to AND circuit 43 are supplied from OR circuit 29 and line 9, so that the output from AND circuit 43 indicates the presence of either a (4) and (1) combination or an (8) and (1) combination, having the decimal values of 5 or 9, respectively. The inputs to AND circuit 45 are supplied from lines 7 and 9, so that the output from AND circuit 45 indicates the presence of a (2) and (1) combination, having the decimal value of 3. AND circuit 47 has its inputs supplied from OR circuit 29 and line 7, so that its output indicates the presence of either a (4) and (2) combination or an (8) and (2) combination, having the decimal values of 6 and 0, respectively.

The outputs from each of AND circuits 43, 45, and 47 are supplied to inputs of OR circuit 35, the output of which is supplied to the Y signal gate; i.e., AND circuit 39.

Since no input exists to AND circuit 37 when a 2-bit and 2-bit only character combination exists, the X pulse will not be supplied to counter 19 for such characters. However, one of the three AND circuits 43, 45, or 47 will provide an output at this time, and via OR circuit 35 and AND circuit 39 will allow a Y pulse to be supplied to counter 19. Thus, it can be seen that a single count is entered in the counter for each and every character containing any combination of two bits. This count, plus the preset count of one, is the correct total number of bits to be transmitted.

From the foregoing, it can be seen that the total number of bits to be transmitted during any given transmission cycle are counted by first presetting the transmission checking counting means to a value equivalent to the presence of one bit only in each of the characters to be transmitted. Thereafter, the count is increased by one for each character containing two bits and by two for each character containing three bits. Obviously, the system may be extended to other codes by providing additional counter entry pulses and the necessary logic circuitry to govern their entry to the counter.

Considering the over-all operation of the system, prior to the start of a transmission cycle, the transmitting and receiving counters are each preset, the transmitting counter being set to a value of the remainder of $N/r$, and the receiving counter being reset to zero.

The transmission cycle is then commenced, each 2-bit and each 3-bit character supplied from source 1 on the parallel output lines adding counts of one and two, respectively, to the preset value in the transmitting check counter 19 by the circuits previously described. At the receiving location, the serially received bits are counted one by one as they arrive, increasing the count in the receiving counter 17. The counts of the two counters are compared by compare unit 21, but the output from this unit is rendered ineffective while transmission is taking place.

At the end of each transmission cycle, an R or reset pulse is produced by the source 1, which enables AND circuit 25 to supply an indication to indicating device 23 which indicates whether or not the transmission was correct, which event can occur only if the counters 17 and 19 have similar counts therein at the end of the cycle. The reset signal R, delayed for a suitable interval to permit readout of the compare unit, is then supplied to counter 19, to again reset the counter preparatory to the next transmission.

While the embodiment shown illustrates parallel-to-serial code conversion for the transmission of the data, it will be apparent to those skilled in the art that parallel transmission can be employed; in which case, the arrangement for counting bits at the receiving end could consist of a parallel-to-serial code converter and an associated bit counter, the equivalent of the converter 11 and counter 17.

While the invention has been particularly shown and described with reference to a preferred embodiment thereof, it will be understood by those skilled in the art that various changes in form and details may be made therein without departing from the spirit and scope of the invention.

What is claimed is:

1. In a data transmission system in which characters to be transmitted comprise one or more signals existing in various combinations on a plurality of signal lines and in which at least one signal is always transmitted for each character, checking means for checking the correct transmission of the data comprising, in combination, transmitting check counting means, means for setting said transmitting check counting means to an initial count representing the number of characters to be transmitted, means for increasing the count in said counting means by one for each signal in excess of one in each character transmitted, receiving check counting means for counting the total number of signals received, and means for comparing the counts in said counting means.

2. In a data transmission system in which characters to be transmitted comprise one or more signals existing in various combinations on a plurality of signal lines and in which at least one signal is always transmitted for each character, checking means for checking the correct transmission for the data comprising, in combination, transmitting check counting means, means for setting said transmitting check counting means to an initial count representing the number of characters to be transmitted during a given transmission cycle, a source of counting pulses, means for supplying pulses from said source to said transmitting check counting means in accordance with the number of signals in excess of one in said characters, receiving check counting means for counting the total number of signals received, and means for comparing the counts in said counting means.

3. In a data transmission system in which characters to be transmitted comprise one or more signals existing in various combinations on a plurality of signal lines and in which at least one signal is always transmitted for each character, checking means for checking the correct transmission of the data comprising, in combination, transmitting check counting means associated with the data transmitting location adapted to be set to an initial count equal to the remainder of $N/r$ prior to each transmission cycle, where N is equal to the number of characters to be transmitted in the given transmission cycle and $r$ is equal to the radix on which said counting means operates; means for setting said transmitting check counting means to said remainder value prior to each transmission cycle; means responsive to signals indicative of characters to be transmitted having combinations of signals greater than one for advancing the count in said counting means in accordance with the number of said signals greater than one; and means for comparing the count of said transmitting counting means with the number of signals received by receiving means supplied with said signals.

4. In a data transmission system in which characters to be transmitted comprise one or more signals existing in various combinations on a plurality of signal lines and in which at least one signal is always transmitted for each character, checking means for checking the correct transmission of the data comprising, in combination, transmitting check counting means; means for setting said transmitting check counting means to an initial count equal to the remainder of $N/r$, where N is the number of characters to be transmitted and $r$ is the number base of the counting means; means for increasing the count in said transmitting check counting means by one for each signal in excess of one in each character transmitted; receiving check counting means for counting the total number of signals received; and means for comparing the counts in said counting means.

5. In a data transmission system in which characters to be transmitted comprise one or more signals existing in various combinations on a plurality of signal lines, in which at least one signal is always transmitted for each character, and in which the number of characters to be transmitted in a given transmission cycle is a predetermined number N, checking means for checking the correct transmission of the data comprising, in combination, a transmitting check counter operating to the number base $r$; means for setting said transmitting check counter to contain an initial count equal to the remainder of $N/r$ prior to the start of a transmission cycle; a source of counting pulses; means governed by the number of signals in each character in excess of one for supplying counting pulses from said source to said transmitting check counter, one such counting pulse being supplied to said counter for each signal in excess of one in each character; a receiving check counter; means for setting said receiving check counter to an initial value of zero prior to each transmission cycle, said receiving check counter being effective to count the total signals received at the receiving end of the system; and means for comparing the counts in said counters.

6. Checking means for a data transmission system, as claimed in claim 5, further comprising means effective at the end of a transmission cycle for providing an output signal from said comparing means.

7. In a data transmission system in which characters to be transmitted comprise one or more signals existing in various combinations on a plurality of signal lines, in which at least one signal is always transmitted for each character, and in which the number of characters to be transmitted in a given transmission cycle is a predetermined number N, said transmission system further comprising means for converting the parallel form of character signals to serial form for transmission over a single transmission channel, and serial code receiving means at the receiving end of the system, a checking system for checking the correct transmission of data comprising, in combination, a transmitting check counter operating on a number base *r*, means effective prior to each transmission cycle for setting said transmitting check counter to an initial count equal to the remainder of *N/r*, logic means including a plurality of coincidence circuits and mixer circuits for determining the excess over one of the number of signals in each character on said signal lines, a source of counter pulses, means governed by said logic means for supplying pulses from said source to said counter in accordance with the number of signals in excess of one on said signal lines, a receiving check counter connected to said transmission channel to receive the serially transmitted signals and provide a total count of all signals received at the receiving location, and comparing means for comparing the counts in both of said counters.

8. Checking means for a data transmission system, as claimed in claim 7, further comprising means effective at the end of a transmission cycle for providing an output signal from said comparing means.

9. In a data transmission system in which characters to be transmitted comprise one or more signals existing in various combinations on a plurality of signal lines, in which at least one signal is always transmitted for each character, and in which the number of characters to be transmitted in a given transmission cycle is a predetermined number N, said transmission system further comprising means for converting the parallel form of character signals to serial form for transmission over a single transmission channel, and serial code receiving means at the receiving end of the system; a checking system for checking the correct transmission of data comprising, in combination, a transmitting check counter operating on a number base *r*, means effective prior to each transmission cycle for setting said transmitting check counter to an initial count equal to the remainder of *N/r*, logic means for determining the excess over one of the number of signals in each character on said signal lines, means for generating a first counting pulse and a second counting pulse occurring in sequence during the interval in which the signals are present on the signal lines to represent a character, means governed by said logic means for supplying either said first and said second pulses or said second pulse only to said counter in accordance with the presence of three signals or the presence of two signals on said signal lines, a receiving check counter connected to said transmission channel to receive the serially transmitted signals and provide a total count of all signals received at the receiving location, and comparing means for comparing the counts in both of said counters.

10. Checking means for a data transmission system, as claimed in claim 9, further comprising means effective at the end of a transmission cycle for providing an output signal from said comparing means.

References Cited in the file of this patent

UNITED STATES PATENTS

| | | |
|---|---|---|
| 2,658,189 | Lovell | Nov. 3, 1953 |
| 2,689,950 | Bayliss et al. | Sept. 21, 1954 |
| 2,694,801 | Bachelet | Nov. 16, 1954 |
| 2,702,380 | Brustman et al. | Feb. 15, 1955 |
| 2,854,653 | Lubkin | Sept. 30, 1958 |